United States Patent [19]

Ha et al.

[11] Patent Number: 5,776,339
[45] Date of Patent: Jul. 7, 1998

[54] WATER PURIFIER HAVING PURIFIED WATER STORAGE TANK AND VALVE FOR DISCHARGING PURIFIED WATER BEFORE REACHING THE TANK

[75] Inventors: Dong-Kyu Ha; Eun-Kwan Lee, both of Suwon, Rep. of Korea

[73] Assignee: Samsung Electronics Co., Ltd., Suwon, Rep. of Korea

[21] Appl. No.: 690,644

[22] Filed: Jul. 29, 1996

[51] Int. Cl.⁶ .................................................. B01D 61/20
[52] U.S. Cl. ........................ 210/257.2; 210/321.65; 210/541
[58] Field of Search .................... 210/195.2, 257.1, 210/257.2, 259, 321.65, 109, 135, 282, 541

[56] References Cited

U.S. PATENT DOCUMENTS

| | | | |
|---|---|---|---|
| 3,856,676 | 12/1974 | Grimme et al. | 210/257.2 |
| 4,528,093 | 7/1985 | Winer | 210/257.2 |
| 4,808,287 | 2/1989 | Hark | 210/257.2 |
| 5,059,317 | 10/1991 | Marius et al. | 210/257.2 |
| 5,096,574 | 3/1992 | Birdsong et al. | 210/195.2 |
| 5,244,579 | 9/1993 | Horner et al. | 210/257.2 |
| 5,290,442 | 3/1994 | Clack | 210/257.2 |
| 5,445,729 | 8/1995 | Monroe et al. | 210/257.2 |

*Primary Examiner*—Joseph W. Drodge
*Attorney, Agent, or Firm*—Burns, Doane, Swecker & Mathis, L.L.P.

[57] ABSTRACT

A water purifier includes a casing containing a filter unit for purifying tap water and conducting the purified water through a first conduit to a storage tank disposed in the casing. Concentrated waste water from the filter unit is discharged from the casing. In order to avoid dissembling the water purifier to determine a ratio of the amount of water being purified to the amount of waste water being generated, a second conduit is connected to the first conduit at a location below the tank. The second conduit communicates with a valve mounted on an exterior wall of the casing. The valve is actuable from outside of the casing to cause purified water from the filter unit to by-pass the tank and instead be collected outside of the casing so that the ratio of purified water to waste water can be determined.

2 Claims, 4 Drawing Sheets

WATER PURIFIER HAVING PURIFIED WATER STORAGE TANK AND VALVE FOR DISCHARGING PURIFIED WATER BEFORE REACHING THE TANK

BACKGROUND OF THE INVENTION

1. Field of the Invention

The present invention relates, in general, to water purifiers used for removing various harmful materials from tap water and providing pure potable water.

2. Description of the Conventional Art

In a typical water purifier used for providing pure potable water, tap water such as city water passes through a filtering means so that various harmful materials are removed from the tap water. The typical water purifiers have been generally classified into several types, that is, natural-filtering type water purifiers, serial-filtering type water purifiers, ion exchange resin type water purifiers and reverse osmotic type water purifiers.

In a typical reverse osmotic water purifier, tap water is pressurized and passes through a synthetic osmotic membrane thereby being purified. The synthetic osmotic membrane filters off various heavy metals, bacteria and cancer-causing materials from the tap water but exclusively allows pure water with dissolved oxygen to pass therethrough. The reverse osmotic water purifiers have been typically used in updated science industries, the medical field and high precision electronic industries. The reverse osmotic water purifying technique also has been actively used with domestic or business water purifiers recently due to water contamination.

FIGS. 1 and 2 show the construction of a typical water purifier. As shown in the drawings, a filter unit 4 comprising a series of filters is installed inside the casing 1 of the water purifier. The filters of the above unit 4 are connected to a water supply pipe 3 in series. The pipe 3 extends from a tap 2 so that the filters of the unit 4 remove various harmful materials from tap water such as city water, which is supplied from the tap 2 through the pipe 3, thus purifying the water. A purified water tank 5 is placed over, and connected to the filter unit 4. The tank 5 contains the purified water discharged from the filter unit 4. The water purifier also includes two additional water tanks, that is, hot water tank 7 and cold water tank 8 which are placed under the purified water tank 5. The hot and cold water tanks 7 and 8 are connected to the purified water tank 5 through respective pipes 6. The purified water of the tank 5 is discharged into the hot water tank 7 thus being heated to an appropriate hot temperature prior to being served to users. Meanwhile, the cold water tank 8 cools the purified water discharged from the tank 5. Provided in the hot water tank 7 is a heater 9, which heats purified water inside the tank 7. Meanwhile, a cooling coil 10 is wound about the cold water tank 8 and performs a water cooling operation by a refrigerating cycle in order to cool the water inside the tank 8. A water distributing pipe 12 extends from the top of each of the hot and cold water tanks 7 and 8 to the outside of the front panel 11 of the casing 1. Two manually actuable main dispensing valves in the form of taps, that is, hot and cold water taps 13 are mounted to the exposed ends of the distributing pipes 12, respectively. The above taps 13 distribute hot and cold purified water from the tanks 7 and 8, respectively. The filters of the above filter unit 4 are elastically and detachably clamped by two fitting brackets 15 so that the filters 4 are vertically arranged inside the casing 1. The above fitting brackets 15 are mounted to a vertical wall 14, which is placed in the middle portion of the inside of the casing 1.

FIG. 3 is a block diagram showing the flow of purified water and concentrated water inside the above described typical water purifier. As shown in FIG. 3, the filter unit 4 includes two pre-processing filters, that is, first and second pre-processing filters 4a and 4b. In operation of the filter unit 4, the tap water, which is supplied from the tap 2, primarily passes through the above filters 4a and 4b in series so that various harmful materials are removed from the tap water. The second pre-processing filter 4b in turn is connected to a pair of reverse osmotic filters 4c and 4d, which are arranged in parallel to each other. A pump 16 is mounted to the line extending from the second pre-processing filter 4c to the reverse osmotic filters 4c and 4d. The pump 16 pressurizes the primarily-purified water flowing from the pre-processing filter 4b to the reverse osmotic filters 4c and 4d. The reverse osmotic filters 4c and 4d secondarily filter off harmful materials from the pressurized water. The filter unit 4 also includes a post-processing filter 4e, which is connected to the reverse osmotic filters 4c and 4d. The post-processing filter 4e finally filters off harmful materials from water, coming out of the reverse osmotic filters 4c and 4d, thus providing finally-purified water. The finally-purified water in turn flows to the purified water tank 5. In order to drain concentrated water generated from the filtering process of the reverse osmotic filters 4c and 4d, a drain pipe 17 extends from the filters 4c and 4d to the outside of the water purifier.

In operation of the above described water purifier, the tap water is supplied from the tap 2 to the filter unit 4 through the pipe 3. Various harmful materials such as heavy metals, bacteria and cancer-causing materials from the tap water are removed from the tap water while the water passes through the filter unit 4. The tap water is thus purified. The purified water is primarily contained in the tank 5 and in turn is discharged to the hot and cold water tanks 7 and 8. The purified water in the hot water tank 7 is heated to an appropriate hot temperature by the heater 9, while the water in the cold water tank 8 is cooled to an appropriate low temperature by the water cooling coil 10.

When the taps 13 are opened by a user, hot and cold purified water of the tanks 7 and 8 flows to the taps 13 through the pipes 12 and in turn is served to the user. In this case, each tap 13 may be opened by, for example, pressing the lever (not shown) of the tap 13 using a cup.

In the above water purifier, it is necessary to appropriately control the ratio of the amount of filtered water to concentrated water (i.e., the water being drained in line 17) within the range of 1:3–1:5. In this case, the purified water is the secondarily-purified water which flows from the reverse osmotic filters 4c and 4d to the post-processing filter 4e, while the concentrated water drains from the above filters 4c and 4d.

However, it is impossible to check the ratio of the amount of purified water to concentrated water using the amount of concentrated water drained to the outside of the water purifier. As a result, the typical water purifiers have a problem in that the expected life span of the filter unit 4, which is the most important element of the water purifiers, is shortened. In addition, the typical water purifiers have an inferior operational performance. Another problem of the above described water purifier resides in that the water purifier is inconvenient to users since it must be disassembled when checking the ratio of the amount of purified water to concentrated water.

SUMMARY OF THE INVENTION

It is, therefore, an object of the present invention to provide a structurally-improved water purifier in which the above problems can be overcome and which lengthens the expected life span of the filter unit and has an improved operational performance.

It is another object of the present invention to provide a water purifier which selectively distributes the purified water to the outside of the water purifier's casing so that the ratio of the amount of purified water to concentrated water can be easily checked outside of the water purifier without disassembling the water purifier.

In order to accomplish the above objects, a water purifier in accordance with the present invention comprises a means for checking the amount of purified water at the outside of the water purifier without disassembling the water purifier, the means being connected to the post-processing filter.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF A PREFERRED EMBODIMENT

Figure 2:
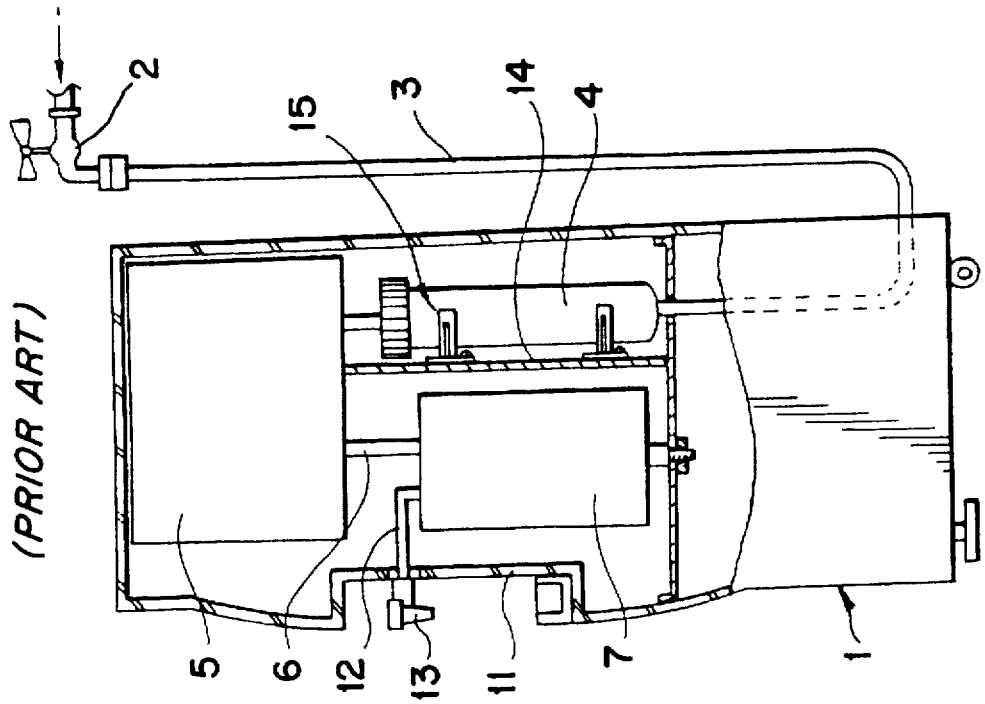
FIG. 2 is a sectional side view showing the construction of the water purifier of FIG. 1.
Figure 1:
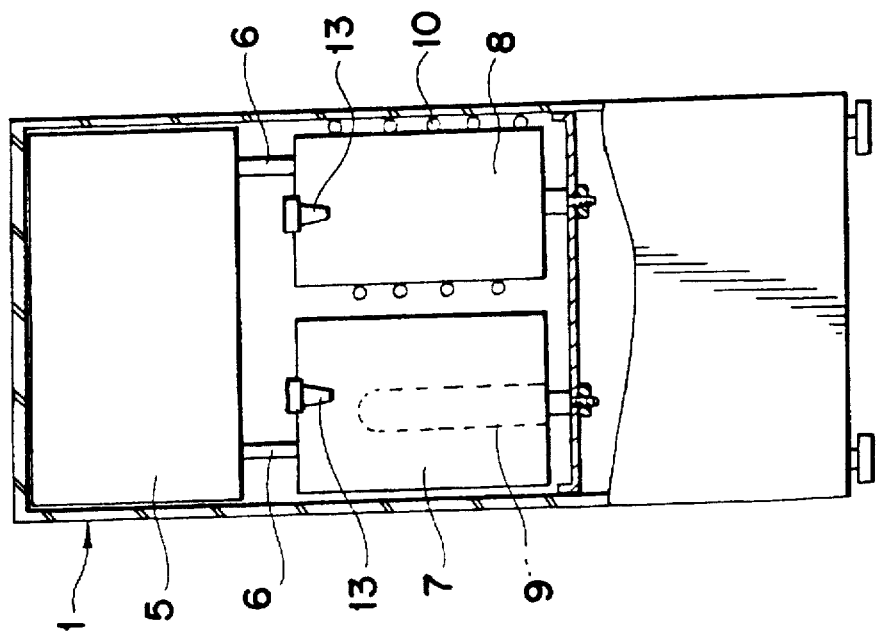
FIG. 1 is a partially sectioned front view of a prior art water purifier.
Figure 3:
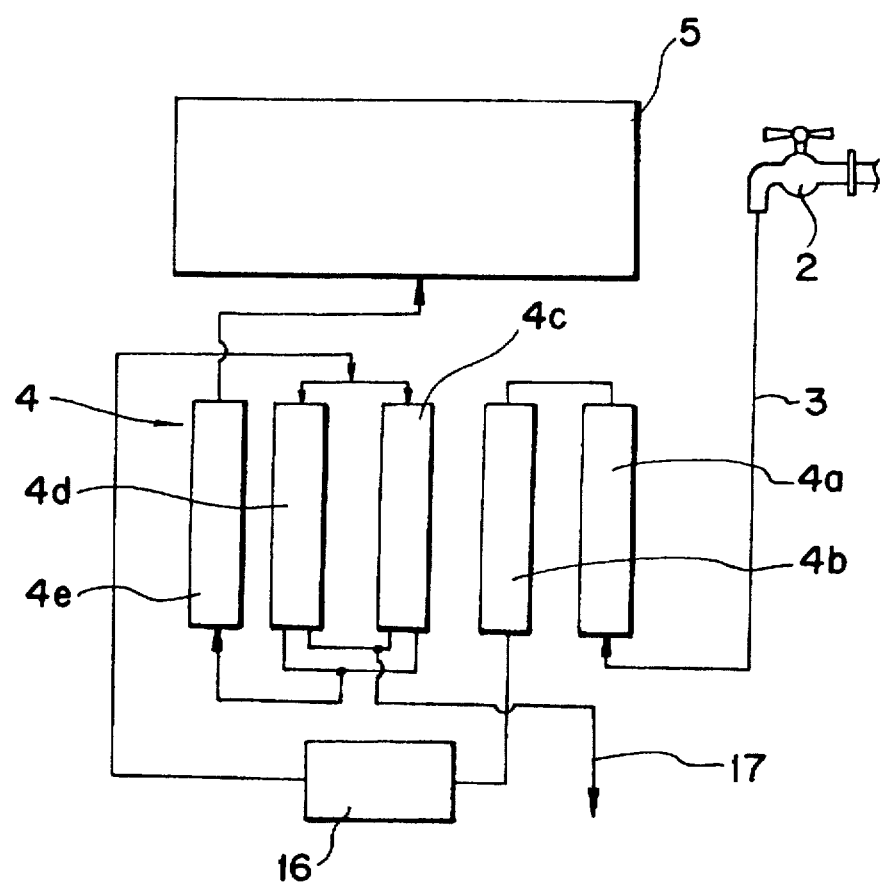
FIG. 3 is a block diagram showing the flow of purified water and concentrated water inside the water purifier of FIG. 1.
Figure 4:
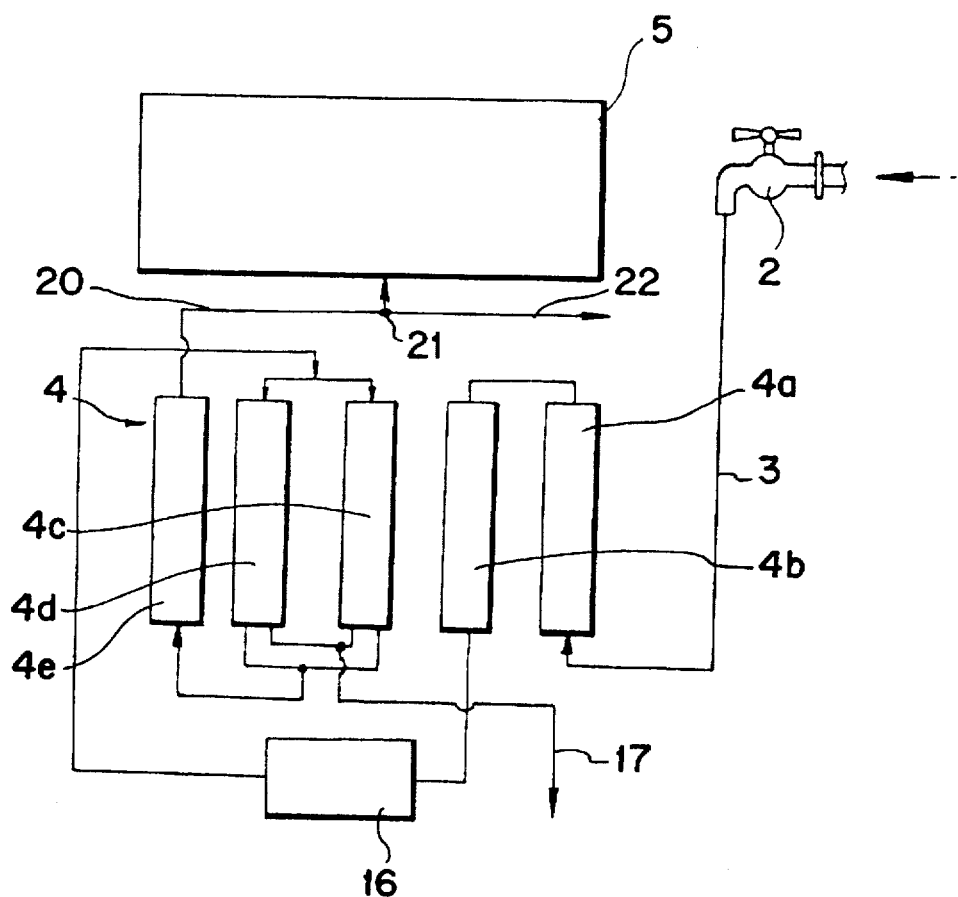
FIG. 4 is a block diagram showing the flow of purified water and concentrated water inside a water purifier in accordance with the preferred embodiment of the present invention.
Figure 5:
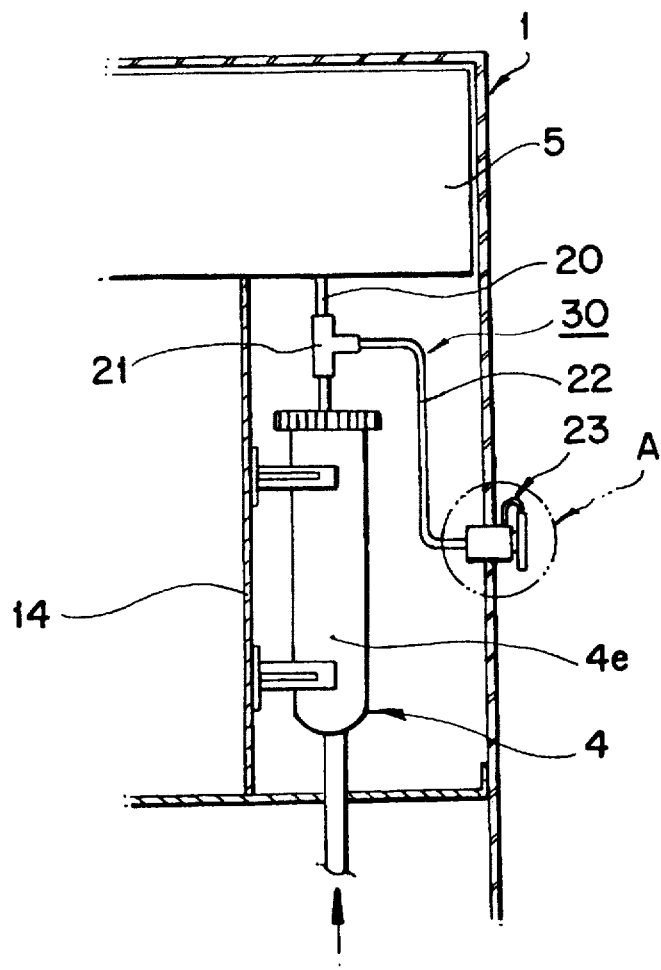
FIG. 5 is a sectional view showing the arrangement of a purified water checking unit installed inside the water purifier of FIG. 4.
Figure 6:
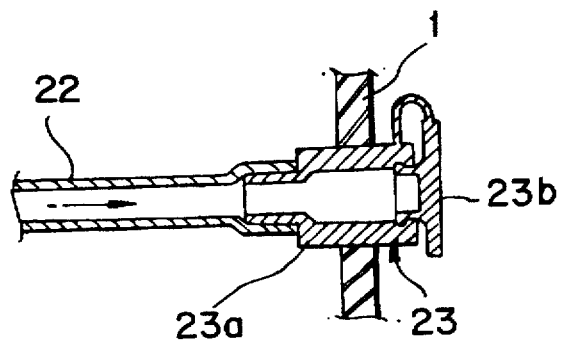
FIG. 6 is a sectional view of the part "A" of FIG. 5, showing the construction of a cock valve of the above checking unit.

In FIGS. 4 to 6, the elements common to both the typical embodiment of FIGS. 1 to 3 and the present embodiment will carry the same reference numerals and further explanation is thus not deemed necessary.

In FIG. 5, the reference numeral 30 denotes a unit for checking the amount of purified water at the outside of the water purifier thus allowing the ratio of the amount of purified water to the concentrated water to be checked without disassembling the water purifier. As shown in FIGS. 4 to 6, the purified water amount checking unit 30 comprises a connection pipe 20. The connection pipe 20 extends from the post-processing filter 4e of the filter unit 4 to the purified water tank 5 and conducts the purified water supplied from the filter unit 4 to the tank 5. A checking pipe 22 is connected to the middle portion of the above connection pipe 20 by means of a T-shaped elbow 21. The checking pipe 22 conducts the purified water flowing in the connection pipe 20 to the outside of the water purifier, thereby allowing the ratio of the amount of purified water to the amount of concentrated water at the outside of the water purifier to be determined. The unit 30 also includes a secondary cock valve 23. The above valve 23 is mounted to the checking pipe 22 on the back wall of the casing 1 and selectively opens the checking pipe 22 when checking the amount of purified water.

In the cock valve 23, one end of a hollow body 23a is fitted into the checking pipe 22 as shown in FIG. 6. The other end of the body 23a penetrates the back wall of the casing 1 and is provided with a manually actuable plug 23b, which selectively opens the hollow body 23a.

The operational effect of the above water purifier will be described hereinbelow.

In order to check the ratio of the amount of purified water to the concentrated water prior to delivery of the water purifiers, the water purifiers are turned on so that tap water is supplied to the pre-processing filters 4a and 4b through the water supply pipe 3 whereby filters 4a and 4b primarily filter off various harmful materials of the water.

The water in turn is pressurized by the pump 16. The pressurized water flows into the first and second reverse osmotic filters 4c and 4d where the harmful materials of the water are secondarily filtered off. The water is thus purified. The purified water in turn flows to the post-processing filter 4e, while concentrated water is drained to the outside of the water purifier through the drain pipe 17. The purified water processed by the post-processing filter 4e in turn flows to the purified water tank 5 through the connection pipe 20.

When the checking pipe 22 in the above state is opened by removing the plug 23b from the cock valve 23, the purified water flowing in the connection pipe 20 does not flow to the tank 5 due to a difference of water pressure between the pipes 20 and 22, but rather is distributed to the outside of the water purifier through the checking pipe 22. In order to check the ratio of the amount of purified water to the concentrated water, the amount of purified water exiting the pipe 22 for a unit time is compared with the amount of concentrated water which is drained through the drain pipe 17 for the same time. Hence, the ratio of the amount of purified water to the concentrated water in the water purifier of this invention can be easily adjusted to the desired ratio of 1:3–1:5 at the outside of the water purifier. After adjusting the ratio of the amount of purified water to the concentrated water, the cock valve 23 is closed by the plug 23b. When the ratio of the amount of purified water to the concentrated water is adjusted to the desired ratio, the contamination of the filter unit 4 is reduced so that the expected life span of the filter unit 4 is lengthened. In addition, the water purifier has an improved operational performance.

As described above, the present invention provides a structurally-improved water purifier. The water purifier of this invention is provided with a unit for checking the amount of purified water at the outside of the water purifier so that the ratio of the amount of purified water to the concentrated water is precisely checked without disassembling the water purifier. The checking unit comprises a checking pipe which is connected to the middle portion of a connection pipe extending from the filter unit to the purified water tank. The checking pipe selectively intercepts the purified water flowing in the connection pipe and distributes the purified water to the outside of the water purifier. A cock valve is mounted to the checking pipe and selectively opens the checking pipe. Due to the above checking unit, the contamination of the filter unit of the water purifier is reduced so that the expected life span of the filter unit is lengthened. In addition, the water purifier has an improved operational performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A water purifier comprising:

a filter unit adapted to filter harmful materials from tap water and provide purified water, and having a drain for draining-off concentrated waste water, said filter unit further having a casing and a series of filters disposed in said casing, including a post-processing filter;

a purified water tank disposed in said casing downstream of said post-processing filter for receiving purified water therefrom;

at least one manually actuable main dispensing valve downstream of said tank for dispensing purified water therefrom; and means comprising a manually actuable secondary valve downstream of said post-processing filter and upstream of said tank arranged for providing a discharge of purified water directly from said post-processing filter so as to prevent flow of purified water into said tank when said secondary valve is opened.

2. The water purifier according to claim 1 wherein said secondary valve includes a hollow body having an outer end opening outside of said casing, and a plug for opening and closing said outer end.

* * * * *